United States Patent
Eggleton et al.

(10) Patent No.: US 6,386,714 B1
(45) Date of Patent: May 14, 2002

(54) CONTROLLING MIRROR SHAPE FOR GENERATING INTERFERENCE PATTERNS AND THE LIKE

(75) Inventors: Benjamin J. Eggleton, Summit; Kenneth S. Feder, Murray Hill; Mikhail Sumetskiy, Bridgewater, all of NJ (US)

(73) Assignee: Lucent Technolgies Inc., Murray Hill, NJ (US)

(*) Notice: Subject to any disclaimer, the term of this patent is extended or adjusted under 35 U.S.C. 154(b) by 0 days.

(21) Appl. No.: 09/849,050

(22) Filed: May 4, 2001

(51) Int. Cl.[7] .................... G02B 5/08; G02B 7/182

(52) U.S. Cl. ............... 359/846; 359/849; 359/291

(58) Field of Search ................. 359/223, 224, 359/846, 847, 848, 849, 291

(56) References Cited

U.S. PATENT DOCUMENTS

| | | | | |
|---|---|---|---|---|
| 4,196,972 A | * | 4/1980 | Rawlings | 359/849 |
| 4,664,488 A | * | 5/1987 | Sawicki et al. | 359/849 |
| 4,708,420 A | * | 11/1987 | Liddiard | 359/199 |

* cited by examiner

*Primary Examiner*—Mark A. Robinson
(74) *Attorney, Agent, or Firm*—Mendelsohn and Associates PC

(57) ABSTRACT

A reflecting apparatus includes a flexible mirror and at least one rocker arm coupling an applied force to a plurality of spaced-apart locations on the mirror to adjust the shape of the mirror. The reflecting apparatus may be used in an interferometer in the path of one of the interfering beams, and adjustments of the shape of the mirror may be used to control the interference pattern generated. The interference pattern created by the apparatus may be used to create fiber Bragg gratings and phase masks, including chirped gratings and masks. An interferometer may use such a reflecting apparatus in the path of each interfering beam.

32 Claims, 2 Drawing Sheets

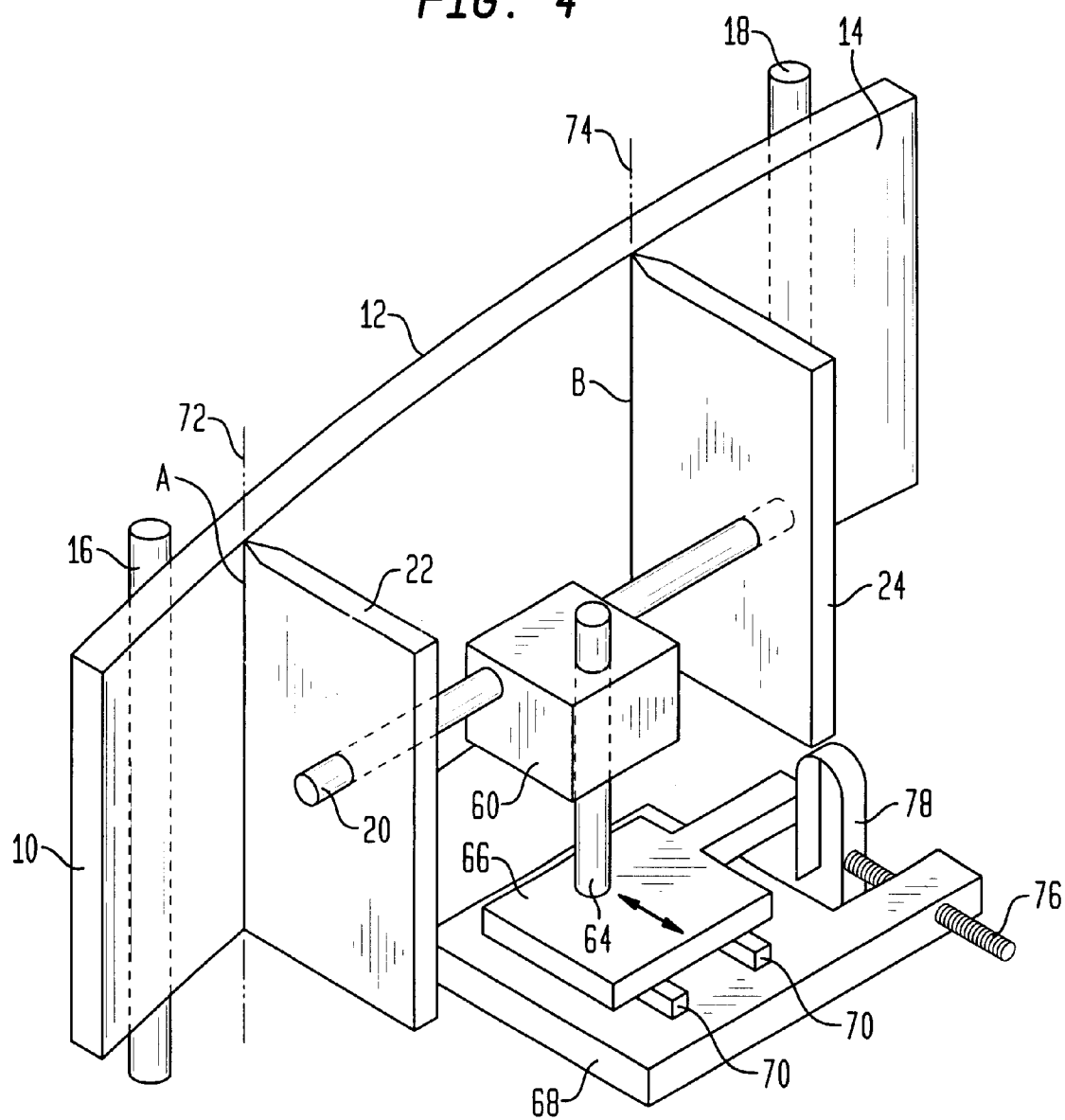

CONTROLLING MIRROR SHAPE FOR GENERATING INTERFERENCE PATTERNS AND THE LIKE

BACKGROUND OF THE INVENTION

1. Field of the Invention

The present invention relates to interferometry and, in particular, to generating interference patterns having desired spatial characteristics. Such interference patterns are useful, for instance, for making Bragg gratings in optical fibers and for making phase masks for making Bragg gratings. This invention also relates to controlling the shape of a mirror in an interferometer so as to generate an interference pattern having desired spatial characteristics.

2. Description of the Related Art

A fiber Bragg grating is a series of refractive index fluctuations formed in an optical fiber. Such gratings are useful for carrying out spectrally selective operations such as filtering, spectral analysis, selective reflection, and selective coupling of light into and out of the fiber. Devices using fiber Bragg gratings are growing in importance. An interferometer may be used directly to generate the desired interference pattern in a photoresponsive fiber; alternatively, an interferometer may be used to generate a phase mask, and the phase mask used to generate the desired interference pattern in the manufacture of fiber Bragg gratings. The phase mask is typically made by exposing a photosensitive plate of glass to an interference pattern created by an interferometer. Illuminating a phase mask with one laser beam produces a pair of diffracted beams that are made to interfere, resulting in a series of interference fringes that fall on the optical fiber. Exposure of the fiber to these fringes leads to formation of the fiber Bragg grating.

There is a growing need for fiber Bragg gratings that are "chirped," i.e., that have a spatially varying period, or a spatially varying separation between successive fringes. Chirped phase masks are readily used to make chirped fiber Bragg gratings. However, conventional interferometric methods are of limited value for making chirped phase masks. Typically, a curved mirror is inserted in the interferometer for this purpose. As a light beam is scanned across the curved surface of the mirror, the illuminated portion of the resulting interference pattern advances across the photosensitive plate while, at the same time, the period of the interference pattern changes. U.S. Pat. No. 5,363,239 issued to Mizrahi et al. provides a detailed background regarding the production of Bragg gratings in general and chirped Bragg gratings in particular, and describes interferometric methods including use of a curved mirror to generate spatially varying interference patterns. The curved mirrors conventionally used for this purpose are either rigid or are flexed by a controllable point load. In either case, the kinds of curvature profile available are very limited. As a consequence, chirp profiles obtainable in an end product, e.g., in fiber Bragg gratings, are of very limited kinds. In particular, it is difficult to provide an extremely linear chirp over a relatively long distance such as a distance greater than one centimeter.

SUMMARY OF THE INVENTION

The present invention provides new methods and apparatus for generating interference patterns that can be used to generate fiber Bragg gratings, phase masks, and the like with a broader range of available characteristics and improved ability to control those characteristics. In one aspect of the present invention, a reflecting apparatus is provided in which the shape of a mirror is controlled by forces of selected magnitude applied at a plurality of selected locations that are applied to the mirror through one or more rocker-arm assemblies so as to flex the mirror. In a preferred embodiment of this aspect, each rocker-arm sub-assembly is adjustable so that one reflecting apparatus may be configured to generate a wide variety of mirror shapes. In another aspect of the present invention, a reflecting apparatus having a mirror shape that is adjustable by a rocker-arm sub-assembly is disposed in an interferometer to provide a controllable or adjustable interference pattern. In a preferred embodiment of this aspect, the interferometer includes one such reflecting apparatus in the path of each of the interfering light beams.

In one embodiment, the present invention is an arrangement having a reflecting apparatus, the reflecting apparatus comprising a mirror, a support structure configured to support the mirror, and a mirror-flexing assembly configured to apply force to the supported mirror, wherein the mirror-flexing assembly comprises a rocker-arm sub-assembly comprising a rocker arm and two force-distribution members spaced apart on the rocker arm and configured to contact at two different locations on the supported mirror, and a force generator configured to generate a force that is pivotably applied to a pivot point of the rocker arm, wherein the force is applied through the force-distribution members to affect the shape of the supported mirror.

In another embodiment, the present invention is a method comprising the steps of supporting a mirror of a reflecting apparatus of an arrangement using a first support structure, and applying force to the supported mirror using a mirror-flexing assembly, wherein the mirror-flexing assembly comprises a rocker-arm sub-assembly comprising a rocker arm and two force-distribution members spaced apart on the rocker arm and configured to contact at two different locations on the supported mirror, and a force generator configured to generate a force that is pivotably applied to a pivot point of the rocker arm, wherein the force is applied through the force-distribution members to affect the shape of the supported mirror.

BRIEF DESCRIPTION OF THE DRAWINGS

The foregoing and other aspects, features, and advantages of the present invention will become more fully apparent from the following detailed description, the appended claims, and the accompanying drawings in which:

FIG. 4 is a schematic diagram illustrating in perspective a reflecting apparatus as in FIG. 1.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. References to directions such as "upper," "lower," or "laterally" are generally merely for convenience in reviewing the drawings, and do not in general imply any limitations as to orientation of any apparatus.

Figure 1:
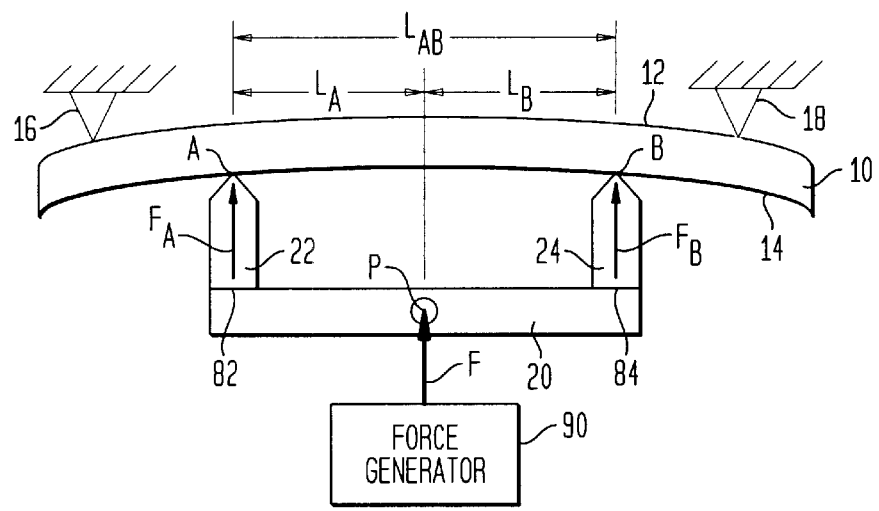
FIG. 1 is schematic diagram illustrating a reflecting apparatus in accordance with the present invention in which the shape of a mirror may be controlled or adjusted.

FIG. 1 is a schematic cross-sectional diagram of a reflecting apparatus illustrating the general manner in which a mirror may be provided with a desired shape in accordance with the present invention. A mirror 10 is restrained against upward movement by mirror-support structure comprising a support 16 and a support 18 in contact with upper surface 12 of mirror 10. One of the surfaces 12 and 14 is reflective; typically mirror 10 is a first-surface mirror and upper surface 12 is reflective, but in some applications it may be desirable to use a second-surface mirror in which surface 14 is reflective.

Because of some intended use of mirror 10 in some particular application, surface 12 will be desired to have some particular shape suitable for that application. For use in an interferometer to make Bragg gratings or phase masks, mirror 10 will generally be curved only in one dimension; that is, if for example the arc illustrated for surface 12 were a section of a circle, then surface 12 would be a section of a circular cylinder whose axis is perpendicular to the plane of the paper. This type of mirror curvature is more easily seen in FIG. 4. Some portion of surface 12 between supports 16 and 18 having the desired shape will be used to reflect an incident light beam, and so supports 16 and 18 will typically be laterally spaced apart and disposed adjacent the edges of mirror 10, as shown in FIG. 1.

Surface 12 will have some initial shape when it is unstressed, prior to application of any forces to adjust its curvature. For use in an interferometer to make Bragg gratings or phase masks, surface 12 may often or desirably be initially flat or nearly so, but in general surface 12 may have any smooth shape. To enable surface 12 to assume a particular shape, force is applied to lower surface 14 of mirror 10 in the upward direction as shown in FIG. 1 so as to change the shape of surface 12. In accordance with the present invention, such force is applied at a plurality of laterally spaced-apart locations on surface 14. In FIG. 1, such force is applied to mirror 10 between the locations at which supports 16 and 18 contact surface 12, which tends to increase the convexity (or reduce the concavity) of upper surface 12 (to an observer located above mirror 10), but force also could be applied outwardly of supports 16 and 18, which would tend to increase the concavity (or reduce the convexity) of upper surface 12.

In FIG. 1, force to lower surface 14 of mirror 10 is applied by a mirror-flexing assembly having a single rocker-arm sub-assembly that includes force-distribution member 22, force-distribution member 24, and rocker arm 20. Force-distribution member 22 contacts lower surface 14 of mirror 10 at location A, and force-distribution member 24 contacts lower surface 14 of mirror 10 at location B. Force-distribution members 22 and 24 are coupled to rocker arm 20 at spaced-apart coupling locations 82 and 84, respectively, so as to establish separation $L_{AB}$ between locations A and B. A force generator 90 is pivotably coupled to rocker arm 20 at a pivot location P between coupling locations 82 and 84, and applies a force F to rocker arm 20 in a direction so as to urge rocker arm 20 in the direction of mirror 10. The pivotable engagement of force generator 90 with rocker arm 20 allows both force-distribution members 22 and 24 to be brought into simultaneous engagement with surface 14. Upon such engagement, the force F is resolved by the rocker-arm sub-assembly into component forces $F_A$ and $F_B$, with $F_A$ being applied by mirror-contacting member 22 to mirror 10 at location A, and $F_B$ being applied by forced-distribution member 24 to mirror 10 at location B. With a mirror having at most a moderate curvature, $F_A$ and $F_B$ will be substantially normal to surface 14. The pivot location P effectively divides rocker arm 20 and the separation $L_{AB}$ into components $L_A$ and $L_B$, the moments of which resolve or distribute the total force F into components $F_A = F (L_B/L_{AB})$ and $F_B = F (L_A/L_{AB})$.

The forces $F_A$ and $F_B$ applied to mirror 10 will bend it and change the curvature of surface 12 from its initial, unstressed curvature. The amount and location of curvature changes, and therefore the resulting shape of surface 12, depend on several factors. These include the dimensions and the material properties, such as modulus of elasticity, of mirror 10; the values of $L_{AB}$, $L_A$, and $L_B$; the locations A and B at which forces are applied; and the magnitude of the force F. With knowledge of these factors and of the initial unstressed shape of surface 12, the shape of surface 12 with that force so applied can be computed. Conversely, with knowledge of the initial shape of surface 12, the desired shape of surface 12, and the dimensions and the material properties of mirror 10, one can compute magnitudes and locations of forces $F_A$ and $F_B$ to be applied, that will result in a shape of surface 12 that is, or approximates, the desired shape (at least, for a particular range of shapes). Thus, for example, for a particular interferometer intended to illuminate photoresponsive substrates to produce Bragg gratings or phase masks having a particular chirp characteristic, the required shape of one or more mirrors of the interferometer may be determined, and the shape for each such mirror may be achieved by selection of a mirror having appropriate dimensions and material properties and initial shape, and altering the shape by application of appropriate forces at appropriate locations through a rocker-arm sub-assembly as illustrated in FIG. 1.

The curvature desired in a particular application for a mirror may be constant over the entire surface, e.g., when the desired shape is a section of a circular cylinder, or the curvature may be desired to vary over the surface of the mirror to provide a more complex shape. If force is applied to the lower surface of a mirror at a single location, the different shapes that can be produced are limited, and depend on the magnitude of the force and its location with respect to the mirror supports. By applying forces to the lower surface of a mirror at two locations, each of the forces being variable in magnitude and location, the system of FIG. 1 enables a larger range of mirror shapes to be produced.

The use of a mirror-flexing assembly as illustrated in FIG. 1 has an important advantage over other systems that might apply forces to the lower surface of a mirror at two locations, such as a pair of separate force generators at spaced locations. In a system where force generators are independently coupled to the mirror, adjustment of the force applied by one of them results in a deflection of the mirror which can vary the force applied by the other, and such interacting adjustments make it difficult to adjust conditions to achieve a desired mirror shape. In contrast, with the mirror-flexing assembly of FIG. 1, whatever force F is applied to rocker arm 20 is distributed between the two locations A and B in a constant ratio determined by the lengths $L_A$ and $L_B$, and adjustment of the force F will result in a change in the degree of curvature of the mirror without otherwise substantially changing its general shape. Thus, the mirror-flexing assembly illustrated in FIG. 1 has many desirable properties for controlling or adjusting the shape of the mirror.

In order to enable a mirror-flexing assembly with a single rocker-arm sub-assembly to provide a wide variety of mirror shapes, its elements are desirably adjustable. For instance, coupling locations 82 and 84 are desirably independently adjustable along the length of rocker arm 20 to adjust $L_A$ and $L_B$, respectively. In addition, the mirror-flexing assembly and the mirror are desirably movable laterally with respect to each other, and force generator 90 is desirably adjustable to vary the magnitude of force F.

Even with the larger range of available shapes that may be produced by application of forces at two locations, the arrangement of FIG. 1 may not permit the shape of a mirror to be adjusted sufficiently closely to a desired shape for practical use in a particular application. In such circumstances, the principle of FIG. 1 may be extended to enable application of forces at more locations on the lower surface of a mirror to increase the range of mirror shapes that can be produced by the mirror-flexing assembly.

Figure 2:
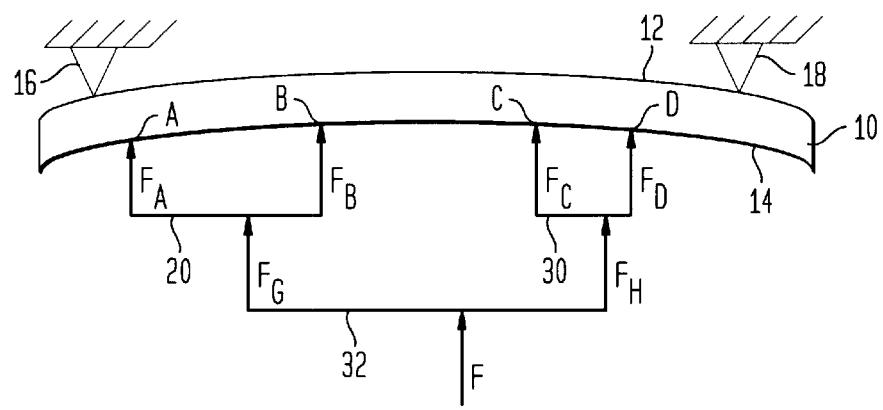
FIG. 2 is a schematic diagram illustrating another reflecting apparatus in accordance with the present invention in which the shape of a mirror may be controlled or adjusted.

FIG. 2 shows more schematically an example of such an extension of the reflecting apparatus of FIG. 1 to apply forces to the lower surface of a mirror at four spaced locations A, B, C, and D. In FIG. 2, elements that correspond to elements of FIG. 1 are numbered correspondingly, but FIG. 2 shows mainly the forces applied to and by a mirror-flexing assembly having three rocker arm assemblies like that shown in FIG. 1. Rocker-arm sub-assembly 20 resolves the force $F_G$ applied to it into component forces $F_A$ and $F_B$, which are applied to mirror 10 at locations A and B. A similar rocker-arm sub-assembly 30 resolves the force $F_H$ applied to it into component forces $F_C$ and $F_D$, which are applied to mirror 10 at locations C and D. A similar rocker-arm sub-assembly 32 resolves the force F applied to it by the force generator into the component forces $F_G$ and $F_H$ that are applied to rocker-arm assemblies 20 and 30. The lengths of the rocker arms in rocker-arm assemblies 20, 30, and 32 and the relative positions at which forces $F_G$, $F_H$, and F are applied to those rocker arms determine how force F is resolved at locations A, B, C, and D, and, in combination with the positions of locations A, B, C, and D on lower surface 14, determine the resulting shape of upper surface 12.

Another variation which might be made includes eliminating rocker-arm sub-assembly 30 and applying force $F_H$ directly to the mirror 10 at a location H, thereby providing three locations A, B, and H where forces may be applied to adjust or control the shape of mirror 10. Still other variations include one or more additional rocker-arm sub-assemblies configured to distribute an applied force F to the mirror. The number of locations at which a single force F may be coupled to separate locations on the lower surface of a mirror may be extended in this fashion to any number desired.

Figure 3:
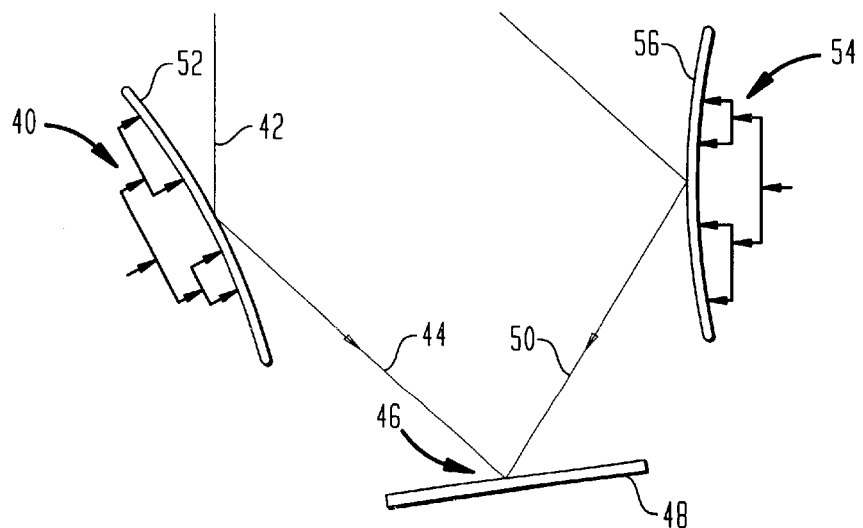
FIG. 3 is a schematic diagram illustrating an interferometric arrangement using a reflecting apparatus in accordance with the present invention.

FIGS. 1 and 2 illustrate reflecting apparatuses having two different mirror-flexing assemblies in which the shape of a mirror may be controlled or adjusted. FIG. 3 is a schematic diagram illustrating an interferometric arrangement using two instances of the reflecting apparatus of FIG. 2. In FIG. 3, a first reflecting apparatus 40 including a mirror 52 is disposed to receive an incident light beam 42 and reflect it as reflected light beam 44 along a path, perhaps involving other optical elements not shown, to a target area 46 where it interferes with another light beam 50 and creates an interference pattern of spatially varying light intensity in target area 46. The shape of mirror 52 is controlled or adjusted using a first instance of the mirror-flexing assembly of FIG. 2 to provide a desired interference pattern in target area 46. A photoresponsive element 48 may be disposed in target area 46 so as to be illuminated by the interfering light beams. Photoresponsive element 48 may for example be a photoresponsive fiber in which a Bragg grating is to be formed or a photoresponsive plate which is to be formed into a phase mask.

Optionally and as illustrated in FIG. 3, it may be advantageous also to provide a second reflecting apparatus 54 in which the shape of a mirror 56 may be controlled or adjusted using a second instance of the mirror-flexing assembly of FIG. 2. Providing two such reflecting apparatuses enables greater control over and variation in the interference pattern created in target area 46. For instance, the second reflecting apparatus may provide negative chirp that counterbalances positive chirp provided by the first reflecting apparatus. In general, the second reflecting apparatus may compensate or correct for deviations of the mirror shape of the first reflecting apparatus from its desired shape and consequent effects on the interference pattern that cannot be compensated easily or at all by force magnitude and location adjustments in the first reflecting apparatus.

FIG. 4 is a schematic diagram illustrating in perspective a reflecting apparatus as in FIG. 1. It should be understood that sizes and positions of the elements shown are not intended to be a scale representation of any particular apparatus. The apparatus of FIG. 4 applies force to a mirror at two locations, and reference numbers used in FIG. 1 will be used to designate corresponding features of FIG. 4 for ease of comparison.

In particular, rocker arm 20 is implemented as a shaft that is slidably mounted in a block 60. Force-distribution members 22 and 24 are implemented as plates that are rotatably mounted to rocker arm shaft 20 to permit an edge of each plate to bear against lower surface 14 of mirror 10. Force-distribution members 22 and 24 and block 60 may be secured at desired locations along rocker arm 20 by conventional means such as shaft collars that are not shown. In interferometric applications it may be desirable for the mirror 10 to be curved only along one axis, and appreciable curvature along the other axis may represent a defect in the nature of astigmatism. To minimize such "astigmatism" of mirror 10, the regions of contact between surface 14 and force-distribution members 22 and 24 are desirably parallel line segments across mirror 10, which may be effected by suitably shaping the contacting edge of these members. As shown, an edge of force-distribution member 22 contacts lower surface 14 of mirror 10 along a segment A of line 72, and an edge of force-distribution member 24 contacts lower surface 14 of mirror 10 along a segment B of line 74. Line segment regions of contact also may be desirable for the same reasons for supports 16 and 18 that contact upper surface 12 and may be achieved in the same way.

Block 60 includes an opening in which a shaft 64 is rotatably disposed to provide the pivot location of the rocker arm. Shaft 64 is secured to movable stage 66 of a linear translation mechanism that includes a base 68 and guides 70 that constrain movement of stage 66 with respect to base 68 in the direction indicated by the arrow depicted on stage 66. Movement of stage 66 in the direction of the arrow causes deflection of mirror 10 in the same direction, and so mirror 10 acts as a spring to modulate the force being applied to it. Thus a mechanism causing translation of stage 66 can implement force generator 90 of FIG. 1.

FIG. 4 shows such a translation mechanism schematically as screw 76 in threaded engagement with base 68; commercially available micrometer screws may be adaptable for such use. Screw 76 could bear directly against stage 66 to directly move stage 66 upon rotation of screw 76. However, the small translations that may be required of stage 66 to adjust mirror 10 to a desired shape may make control of the shape difficult even when using a finely threaded screw such as a micrometer screw. Accordingly, it is preferred to couple screw 76 to stage 66 through a spring, which increases the translation required of screw 76 to cause a given change in force applied to rocker arm shaft 20. A particularly preferred type of spring is the U-shaped spring 78 shown in FIG. 4, which may be detachably secured along one of its arms to stage 66 by means not shown. By moving spring 78 in a direction parallel to its arms, its points of contact with screw 76 and stage 66 are moved closer to or farther from the apex of spring 78, which varies its effective spring constant and enables adjustment of the force versus translation characteristics of the apparatus to suit a wide variety of mirror-flexing applications.

The present invention has been described in the context of embodiments in which a mirror is curved in one dimension using a mirror-flexing assembly having linear supports and force-distribution members that are configured to contact the upper and lower surfaces of the mirror along parallel lines. In alternative embodiments of the present invention, the mirror may be curved in two dimensions. Such two-dimensional curvatures may be achieved using mirror-flexing assemblies having (1) one or more linear supports and force-distribution members configured along non-parallel lines and/or (2) one or more point supports and force-distribution members configured to contact the upper and/or lower surfaces of the mirror at discrete point locations. In other alternative embodiments of the present invention, the force-distribution members may be secured to a surface of the mirror, and a pulling force may be pivotably applied to a rocker arm sub-assembly to flex the mirror; in such embodiments, in order to restrain the movement of the mirror, the supports may bear against the same side of the mirror to which the rocker arm sub-assembly is secured, or the supports may be secured to the mirror on the side of the mirror opposite that to which the rocker arm sub-assembly is secured.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. An arrangement having a first reflecting apparatus, the first reflecting apparatus comprising:
   (a) a first mirror;
   (b) a first support structure configured to support the first mirror; and
   (c) a first mirror-flexing assembly configured to apply force to the supported first mirror, wherein:
      the first mirror-flexing assembly comprises:
         (1) a first rocker-arm sub-assembly comprising a rocker arm and two force-distribution members spaced apart on the rocker arm and configured to contact at two different locations on the supported first mirror; and
         (2) a first force generator configured to generate a force that is pivotably applied to a pivot point of the rocker arm, wherein the force is applied through the force-distribution members to affect the shape of the supported first mirror.

2. The invention of claim 1, wherein:
   the first mirror-flexing assembly further comprises one or more additional rocker-arm sub-assemblies configured with the first rocker-arm sub-assembly to apply the force generated by the first force generator to affect the shape of the supported first mirror;
   each additional rocker-arm sub-assembly comprises a rocker arm and two force-distribution members spaced apart on the rocker arm; and
   each force-distribution member of each rocker-arm sub-assembly is configured to apply a force either (i) to the first mirror or (ii) to a pivot point of a rocker arm of another rocker-arm sub-assembly.

3. The invention of claim 1, wherein positioning of the two force-distribution members on the rocker arm is adjustable.

4. The invention of claim 1, wherein positioning of the two different locations at which the two force-distribution members contact the first mirror is adjustable.

5. The invention of claim 1, wherein positioning of the pivot point on the rocker arm is adjustable.

6. The invention of claim 1, wherein the force generated by the first force generator is adjustable.

7. The invention of claim 1, wherein each location at which a force-distribution member contacts the first mirror has a shape that is substantially linear.

8. The invention of claim 1, wherein the first force generator comprises a translation mechanism having a screw configured to translate a movable portion of the translation mechanism relative to a fixed portion of the translation mechanism to apply the force to the first mirror-flexing assembly.

9. The invention of claim 8, wherein the first force generator further comprises a spring configured to reduce translation of the movable portion of the translation mechanism relative to translation of the screw.

10. The invention of claim 1, further comprising a first light generator configured to generate a first light beam that is reflected by the first mirror of the first reflecting apparatus, wherein the reflected first light beam generates an interference pattern with a second light beam at a target area.

11. The invention of claim 10, wherein the interference pattern is a chirped interference pattern.

12. The invention of claim 10, further comprising a second reflecting apparatus comprising a second mirror configured with a second mirror-flexing assembly comprising one or more rocker-arm sub-assemblies configured to a second force generator, wherein:
   the one or more rocker-arm sub-assemblies distribute a force generated by the second force generator to affect the shape of the second mirror; and
   the second light beam is reflected by the second mirror of the second reflecting apparatus towards the target area.

13. The invention of claim 1, wherein the first support structure comprises two supports contacting the first mirror along two different locations having substantially linear shapes.

14. The invention of claim 1, wherein positioning of the two force-distribution members on the rocker arm with respect to the pivot point is adjustable; the force generated by the first force generator is adjustable; each location at which a force-distribution member contacts the first mirror has a shape that is substantially linear; the first force generator comprises a translation mechanism having a screw configured to translate a movable portion of the translation mechanism relative to a fixed portion of the translation mechanism to apply the force to the first mirror-flexing assembly; the arrangement further comprising a first light generator configured to generate a first light beam that is reflected by the first mirror of the first reflecting apparatus, wherein the reflected first light beam generates an interference pattern with a second light beam at a target area.

15. A method, comprising the steps of:
(a) supporting a first mirror of a first reflecting apparatus of an arrangement using a first support structure;
(b) applying force to the supported first mirror using a first mirror-flexing assembly, wherein:
the first mirror-flexing assembly comprises:
(1) a first rocker-arm sub-assembly comprising a rocker arm and two force-distribution members spaced apart on the rocker arm and configured to contact at two different locations on the supported first mirror; and
(2) a first force generator configured to generate a force that is pivotably applied to a pivot point of the rocker arm, wherein the force is applied through the force-distribution members to affect the shape of the supported first mirror.

16. The invention of claim 15, wherein:
the first mirror-flexing assembly further comprises one or more additional rocker-arm sub-assemblies configured with the first rocker-arm sub-assembly to apply the force generated by the first force generator to affect the shape of the supported first mirror;
each additional rocker-arm sub-assembly comprises a rocker arm and two force-distribution members spaced apart on the rocker arm; and
each force-distribution member of each rocker-arm sub-assembly is configured to apply a force either (i) to the first mirror or (ii) to a pivot point of a rocker arm of another rocker-arm sub-assembly.

17. The invention of claim 15, wherein positioning of the two force-distribution members on the rocker arm is adjustable.

18. The invention of claim 15, wherein positioning of the two different locations at which the two force-distribution members contact the first mirror is adjustable.

19. The invention of claim 15, wherein positioning of the pivot point on the rocker arm is adjustable.

20. The invention of claim 15, wherein the force generated by the first force generator is adjustable.

21. The invention of claim 15, wherein each location at which a force-distribution member contacts the first mirror has a shape that is substantially linear.

22. The invention of claim 15, wherein the first force generator comprises a translation mechanism having a screw configured to translate a movable portion of the translation mechanism relative to a fixed portion of the translation mechanism to apply the force to the first mirror-flexing assembly.

23. The invention of claim 22, wherein the first force generator further comprises a spring configured to reduce translation of the movable portion of the translation mechanism relative to translation of the screw.

24. The invention of claim 15, further comprising the step of generating, using a first light generator, a first light beam that is reflected by the first mirror of the first reflecting apparatus, wherein the reflected first light beam generates an interference pattern with a second light beam at a target area.

25. The invention of claim 24, wherein the interference pattern is a chirped interference pattern.

26. The invention of claim 25, further comprising the step of disposing a photoresponsive workpiece in the target area to generate an article having spatially varying optical characteristics corresponding to the interference pattern.

27. The invention of claim 26, wherein the photoresponsive workpiece is a plate, and the article is a phase mask.

28. The invention of claim 26, wherein the photoresponsive workpiece is an optical fiber, and the article is a fiber Bragg grating.

29. The invention of claim 24, wherein the second light beam is reflected by a second mirror of a second reflecting apparatus towards the target area, wherein:
the second mirror is configured with a second mirror-flexing assembly comprising one or more rocker-arm sub-assemblies configured to a second force generator; and
the one or more rocker-arm sub-assemblies distribute a force generated by the second force generator to affect the shape of the second mirror.

30. The invention of claim 29, wherein the shape of the second mirror compensates for one or more deviations of the shape of the first mirror from a desired first-mirror shape.

31. The invention of claim 15, wherein the first support structure comprises two supports contacting the first mirror along two different locations having substantially linear shapes.

32. The invention of claim 15, wherein positioning of the two force-distribution members on the rocker arm with respect to the pivot point is adjustable; the force generated by the first force generator is adjustable; each location at which a force-distribution member contacts the first mirror has a shape that is substantially linear; the first force generator comprises a translation mechanism having a screw configured to translate a movable portion of the translation mechanism relative to a fixed portion of the translation mechanism to apply the force to the first mirror-flexing assembly; the arrangement further comprising a first light generator configured to generate a first light beam that is reflected by the first mirror of the first reflecting apparatus, wherein the reflected first light beam generates an interference pattern with a second light beam at a target area.

* * * * *